Sept. 5, 1967  R. H. SOVAR ETAL  3,339,279
HOLLOW ENGRAVING POINT AND HOLDER FOR ENGRAVING
COATED TRANSPARENT SHEETS
Filed July 17, 1964  3 Sheets-Sheet 1
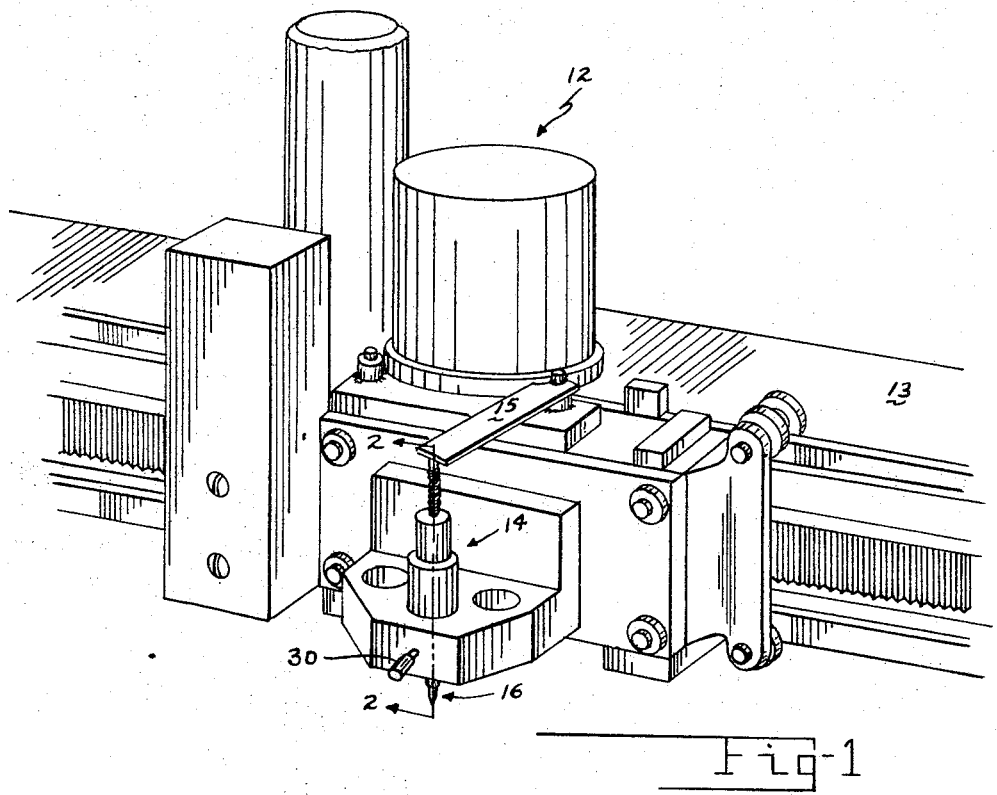
Fig-1
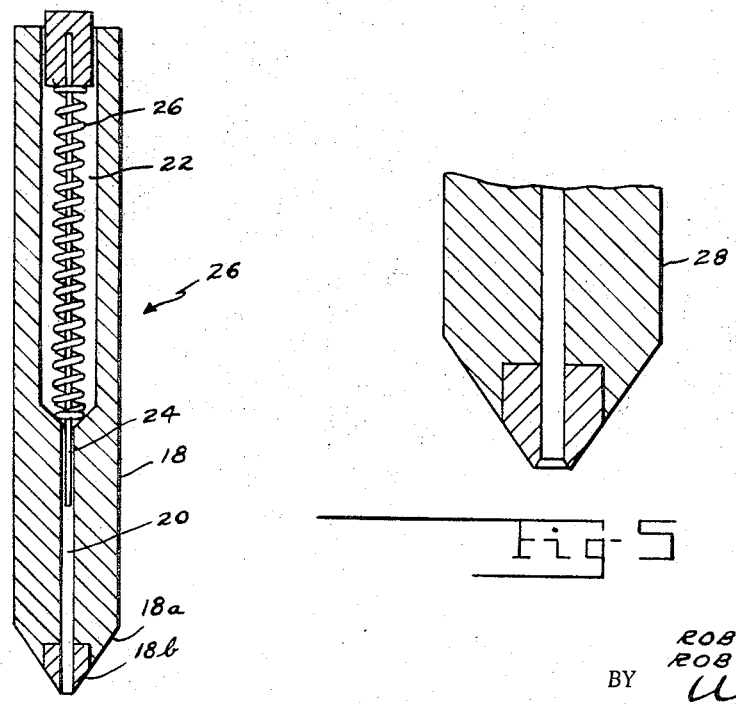
Fig-4
Fig-5
INVENTORS
ROBERT H. SOVAR
ROBERT H. SICKING
BY
ATTORNEYS

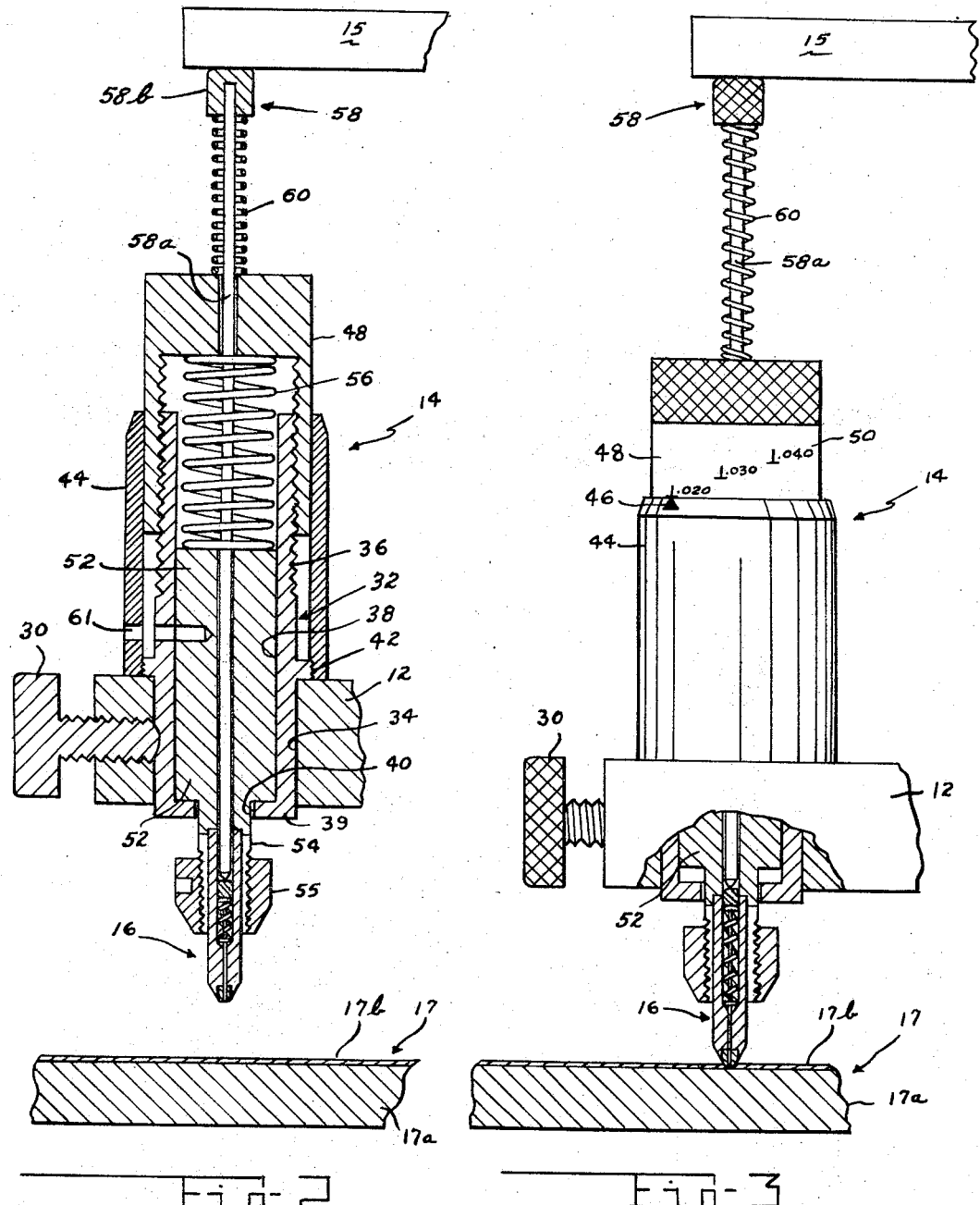

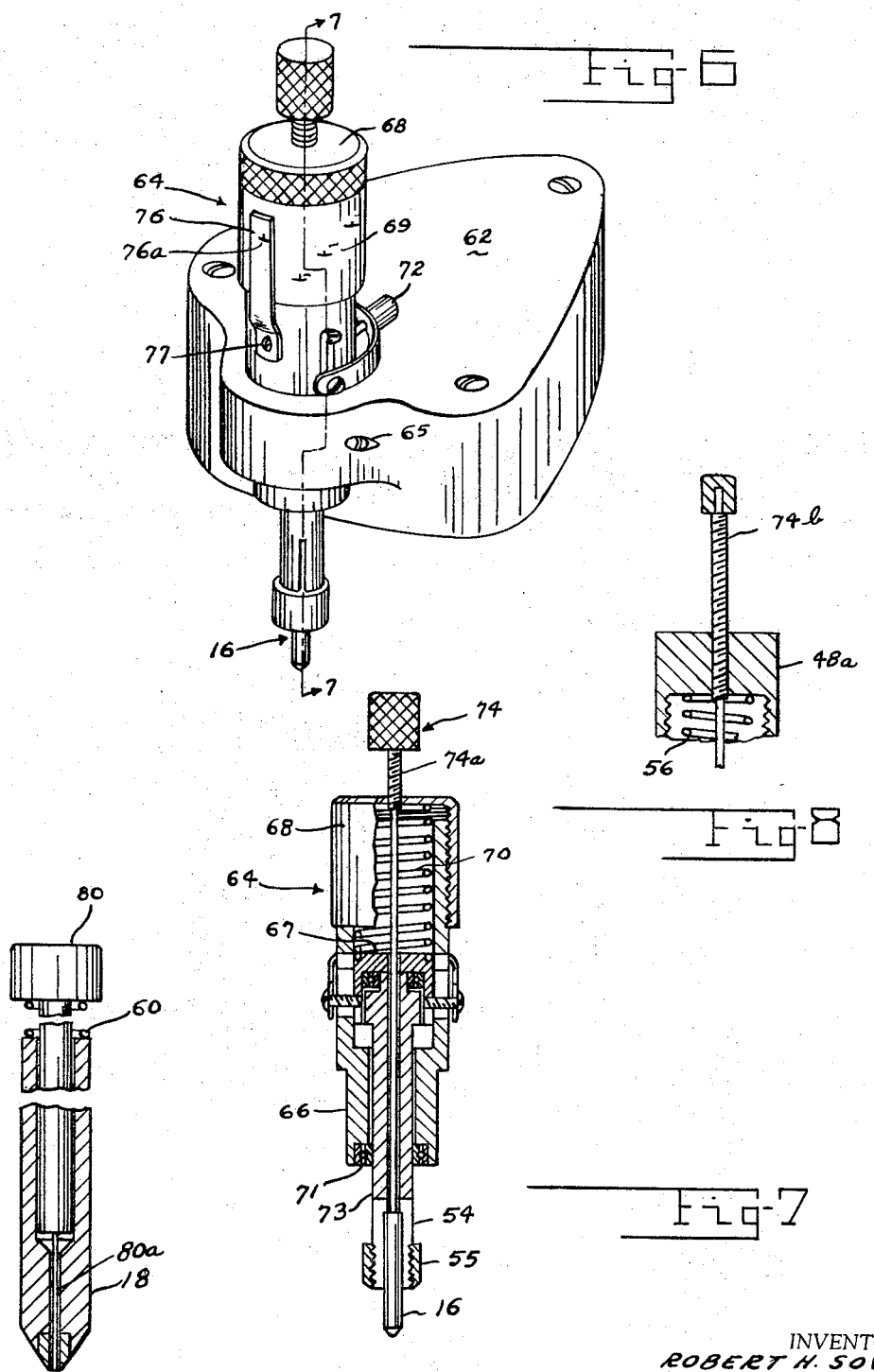

United States Patent Office 3,339,279
Patented Sept. 5, 1967

3,339,279
HOLLOW ENGRAVING POINT AND HOLDER FOR ENGRAVING COATED TRANSPARENT SHEETS
Robert H. Sovar, 2552 Redman 63136, and Robert H. Sicking, 5705 Itaska 63109, both of St. Louis, Mo.
Filed July 17, 1964, Ser. No. 384,049
29 Claims. (Cl. 30—164.9)

The invention described herein may be manufactured and used by or for the United States Government for governmental purposes without the payment to us of any royalty thereon.

This invention relates to the engraving art, and more specifically to tools used in the engraving of coated transparent sheets.

A relatively recent development in producing contour maps, road maps, weather maps, engineering drawings, circuit master negatives, and the like, is to scribe or engrave the negatives on coated transparent sheets. The material forming the negative resembles a photographic negative after development; in that a transparent body carries an opaque coating on its surface. The body of the negative may be glass, but is usually made of a transparent and flexible plastic film. The film is covered on one side with a photographically opaque coating having proper physical characteristics. Such film and coating materials are now well known to the art, and will not be further described.

The actual negative is prepared on the above described coated base, by selectively removing a portion of the opaque coating material. When a negative, having been so prepared, is placed in the rays emitting from an illuminating light source, the light rays will pass through the negative in those areas where the coating has been removed, and will be completely blocked in those areas which remain coated with the opaque coating material.

Portions of the opaque coating are removed by various scribing instruments, each designed for a specific purpose. Several common forms of scribing instruments terminate in conical points for scribing narrow lines, and in blade points for scribing wider lines. Scribing instruments may be further classified into tracking scribers and rigid or nontracking scribers. An example of a tracking scriber would be one in which two conical points are mounted side by side and swiveled to produce two parallel lines such as often indicate a road or highway on a map. An example of a rigid scriber would be one which rigidly supports a conical point capable of scribing equally well in all directions of movement.

This invention has its primary application on rigid scribers using conical points. A very prominent use for such a scriber is on electronic data plotters. Past scribers of this character have not been completely satisfactory for reasons including (1) usual conical points require extreme pressure to initially penetrate the coating when wide lines are to be scribed, and (2) the usual conical point will not commence scribing immediately when brought into contact with the coating to be removed.

The invention, to be hereinafter described, provides a conical point which eliminates the above mentioned unsatisfactory conditions, and further provides various holders which abet the proper and efficient use of the novel points. The invention will be shown and described both in connection with data plotters and with hand operated scribers.

One object of the present invention is to provide a hollow engraving point requiring less pressure to start the scribing action than a solid point.

Another object of the present invention is to provide a hollow engraving point which will commence scribing immediately when brought to bear against the coated material to be scribed.

A further object of the present invention is to provide an engraving point which will penetrate the coating to be scribed with less critical pressure requirements through a broader range of line widths.

Yet another object of the present invention is to provide an axially bored engraving point providing a passage for the entry of the slug produced when the point is brought into initial engagement with the coating on the material to be scribed.

Another object of the present invention is to provide a holder having means for ejecting slugs of coating from within the hollow engraving point.

A further object of the present invention is to provide a holder having calibrated means for controlling the engaging pressure of the engraving point against the material being scribed.

Yet another object of the present invention is to provide a holder in accordance with the above objects which may be readily moved from one scribing machine or instrument to another.

A still further object of the present invention is to provide in combination a hollow engraving point and holder having greater efficiency and ease in operation than previous combinations.

Additional objects, advantages and features of the invention reside in the construction, arrangement and combination of parts involved in the embodiments of the invention as will appear from the following description and accompanying drawings wherein:

FIG. 1 is a perspective view of a control unit on a typical electronic data plotter supporting an engraving point and holder as contemplated by this invention;

FIG. 2 is a cross-sectional elevation taken on line 2—2 of FIG. 1 and showing one embodiment of the invention in the uppermost position;

FIG. 3 is a vertical elevation, partially in section, and similar to FIG. 2, showing the engraving point engaging the material to be scribed;

FIG. 4 is a cross-sectional elevation through one embodiment of the engraving point;

FIG. 5 is a partial cross-sectional elevation through another embodiment of the engraving point;

FIG. 6 is a perspective of a typical hand scriber using one embodiment of the holder and engraving point;

FIG. 7 is a cross-sectional elevation along line 7—7 on FIG. 6;

FIG. 8 is similar to the upper portion of FIG. 2 and showing an alternate actuating rod; and FIG. 9 is a cross section through another embodiment of the engraving point adapted to a modified actuating rod for use on the holders of FIG. 2 and FIG. 7.

FIG. 1 shows a fragmentary portion of an electronic data plotter such as manufactured by the Universal Drafting Machine Corporation. Joined to the control unit 12, which moves on the racked rail 13, is holder assembly 14 supporting the hollow engraving point assembly 16. Joined to a nonrising portion of the control unit, as shown, is a strap 15 whose purpose will be hereinafter described. A portion of the control unit, to which the holder assembly is joined, is operable on command to bring the engraving point into engagement with the negative 17 as shown on FIG. 3. The negative 17 is supported by the plotter, in a manner not shown, since this does not constitute a portion of the invention. The negative 17 may consist of a base element 17a, such as glass or transparent plastic, which is covered on the upper surface with an opaque coating 17b.

Referring to FIG. 4, the hollow engraving point assembly 16 has an elongated circular body 18 terminating at one end in a scribing tip such as conical tip 18a having a hard insert wear tip 18b. Although the entire body may be made of hardened steel, it is much better that the body be made of soft steel and an insert wear tip of a material such as diamond or sapphire be used for prolonged life. Axially bored through the body is a circular bore 20 terminating at the end opposite from the conical tip in an enlarged diameter open end coaxial counterbore 22. The bore 20 passing through the conical tip of the body provides an extremely sharp, long wearing piercing or cutting edge for cutting through the coating on the negative when the point is brought into engagement, and for scribing by removing a portion of the coating when the point is horizontally moved while engaging the negative.

Contained within body 18 is an ejector pin 24 axially movable within the body. The ejector pin has a first end engaging the circular bore 20 in the body, and a second end of larger diameter for slidably engaging the counterbore. The ejector pin may be made in one piece if desired or, for manufacturing ease, may be made in two pieces as shown. Circumferentially surrounding the first end of the ejector pin and nested within the counterbore of the body is a compression spring 26 biasing the ejector pin from the conical tip on the body.

A second embodiment of the engraving point assembly is shown on the fragmentary FIG. 5. Only the lower portion of the body is shown; all other elements being identical with FIG. 4. Body 28 of FIG. 5 is identical with body 18 of FIG. 4 except that the conical tip end on body 28 is flared to form a hollow ground scribing tip, as shown.

As previously stated, when the engraving point is brought into engagement with the negative to be scribed, a small slug of coating will be cut free and will enter the bore in the body. When the engraving point assembly is lifted, the slug will be purged by plunging the retracted ejector pin to protrude through the bore at the scribing tip end of the elongated body.

The entire hollow engraving point assembly 16 is not required. The scribing operation may be conducted by the use of either body 18 shown on FIG. 4, or body 28 shown on FIG. 5. If such use is desired, the bodies may be purged in a manner to be hereinafter disclosed.

Referring to FIG. 1, FIG. 2 and FIG. 3, holder assembly 14 is joined to the appropriate vertically movable portion of control unit 12 by means of set screw 30. The holder assembly 14 has an elongated body member 32, the lower end of which passes through bore 34 in control unit 12, and the upper end of which has external threads 36. The body member 32 contains a circular cavity 38, open at the upper end and forming an end wall 39 at the lower end of the body member which contains a coaxial bore 40 passing therethrough. The body member 32 also has an externally threaded flange 42 for abutting against the control unit 12 and thereby limiting the axial movement of the holder assembly in relation to the control unit.

Upwardly extending from and joined to the externally threaded flange 42 on body member 32 is a tubular barrel 44, the free upper end of which may be beveled as shown and scribed with an axial index line or pointer 46, as best shown on FIGURE 3.

Disposed to be between the upper threaded end of body member 32 and tubular barrel 44 is a thimble 48 having internal threads engaging threads 36 on the body member and having the closed end thereof upwardly extending from the body member. The external portion of the thimble extending above the end of the tubular barrel 44 is graduated with any convenient markings 50, as shown on FIG. 3. The purpose of the graduations will be hereinafter explained.

Contained within the circular cavity 38 of body member 32 is an elongated circular plunger 52, having at the lower end thereof a coaxial reduced diameter end passing through bore 40 in the end wall 39 of the body member, and terminating in a conventional split collet chuck 54 which may be contracted by chuck collar 55. The collet chuck 54 and chuck collar 55 have the conventional taper thread well known to the art and will, therefore, not be further described.

Nesting within the circular cavity 38 of the body member 32 and above the upper end of plunger 52, where it is retained by thimble 48, is a compression spring 56 axially biasing the plunger to the bottom of the circular cavity. Axially bored through both the thimble 48 and the plunger 52 is a bore for slidably receiving an ejector pin actuating rod 58. The actuating rod may be made in one piece or, for ease of manufacture, may be made in two pieces comprising a rod 58a and a head 58b. Coaxially surrounding rod 58a and disposed between the top of thimble 48 and head 58b is a compression spring 60. Spring 60 tends to lift the ejector pin actuating rod 58 and biases it against the strap 15 joined to the control unit 12.

As the thimble is rotated in relation to the body member 32, the biasing force exerted by the compression spring 56 is accordingly varied. When the movable portion of the control unit is lowered to bring the hollow engraving point assembly 16 into engagement with the negative as shown on FIG. 3, the plunger 52 is axially moved against the compression spring 56 to thereby apply a force against the engraving point to keep it in penetration through the coating on the negative. The markings 50 on the thimble 48 may be arbitrary or may be made to indicate axial positions in thousandths of an inch, or may be made to indicate an applied force such as grams on the point engaging the negative. When an engraving point assembly is to be inserted into or removed from the holder assembly 14, the chuck collar 55 may be rotated until the holes 61, which are transverse in the tubular barrel 44, body member 32, and plunger 52 are in alignment; at which time any convenient pin may be inserted and the chuck collar may be loosened or tightened.

The action of the engraving point assembly 16 is clearly shown on FIG. 2 and FIG. 3. When the control unit 12 is in its uppermost position, as shown on FIG. 2, the engraving point assembly is out of engagement with the negative, and the ejector pin actuating rod 58 plunges the end of ejector pin 24 to or through the scribing tip of the body of the engraving point assembly to eject any coating fragments from the bore within the body. When the control unit 12 is lowered to bring the engraving point assembly into engagement with the negative, compression spring 60 lifts the ejector pin actuating rod 58, permitting spring 26 in the engraving point assembly to likewise lift or retract the ejector pin 24; thus providing an open bore into which coating fragments from the negative may enter.

Another embodiment of the invention, as shown on FIG. 6, is a modification of Koenig 2,902,760, Scribing Instrument. The scribing instrument of Koenig is modified to use the hollow engraving point assembly 16 in the manner previously disclosed. Referring to FIG. 6, the hand scriber has a scriber body 62 and a lifting holder assembly 64 which is removably retained in a vertical bore in the scriber body 62 by means of a recessed set screw 65.

Referring to FIG. 7, the lifting holder assembly 64 has a body member 66 which may be identical with member 10 of the referenced patent, and a cap 67 which is similar to and has the same function as cap 24 of the referenced patent. The thimble 68 may be similar to member 46 of the referenced patent, except for the addition of graduations 69 which are shown on FIG. 6, and are for the same purpose as the graduations 50 shown on FIG. 3. Compression spring 70 is likewise similar to spring 28 of the referenced patent. The bearings 71 may be identical with bearings 20 and 22, and actuating lever 72 may be similar to handle 57 of the referenced patent in which its construction and operation is adequately described.

Contained within the structure above described, is a plunger 73 which is similar to member 18 of the referenced patent, with certain modifications to be hereinafter described and which constitute a portion of the improvements to be claimed.

The specific improvements over the scribing instrument of the referenced patent are the alteration of the lower end of plunger 73 to incorporate a split collet chuck 54 and chuck collar 55 identical with those on FIG. 2, for removably retaining a hollow engraving point assembly 16; and the addition of an axial bore through plunger 73, cap 67 and thimble 68 for slidably receiving ejector pin actuating rod 74. The ejector pin actuating rod 74 may be provided with a threaded section 74a for engaging mating threads in thimble 68 as shown. In addition to the above modifications, an index bracket 76, having an index pointer 76a, is joined to body member 66 by means of a screw 77, and provides a convenient reference proximate to the barrel of the thimble for reading the graduations 69 which had been added to the thimble.

The ejector pin actuating rod 74 may easily be adjusted to purge the hollow engraving point assembly when the engraving point is lifted from the negative by means of actuating lever 72. If the thimble is repositioned to change the pressure on the point, the actuating rod 74 must also be repositioned in order to maintain the proper relative relationship between the actuating rod and the engraving point assembly.

The embodiment of the invention shown on FIG. 2 and FIG. 3 may be modified as shown on FIG. 8 when it is desired to use the holder assembly 14 in combination with the scriber body 62 of FIG. 6 as a nonlifting instrument. The thimble 48a of FIG. 8 is identical with thimble 48 of FIG. 2, except that the bore is threaded to receive ejector pin actuating rod 74b which is similar to the actuating rod 74 shown on FIG. 7.

When it is desired to use only the body 18 portion of point assembly 16 (that is, without ejector pin 24 and spring 26), the original ejector pin actuating rod 58 (FIG. 2) may be modified to the configuration of purge rod 80 shown on FIG. 9. Purge rod 80 is made enough longer than the ejector pin actuating rod 58 to compensate for the ejector pin 24 which was omitted. The end of the purge rod engaging body 18 terminates in a reduced diameter ejector pin portion 80a, which serves the identical purpose and functions in the same manner as ejector pin 24. The purge rod 80 and body 18 may be substituted on FIG. 2 for the hollow engraving point assembly 16 and ejector pin actuating rod 58. The purge rod 80 may be provided with a threaded section such as threaded section 74a on ejector pin actuating rod 74 shown on FIG. 7. In this event the purge rod 80 and body 18 may be substituted for the hollow engraving point assembly 16 and ejector pin actuating rod 74 on FIG. 7.

It is to be understood that the embodiments of the present invention as shown and described are to be regarded as illustrative only and that the invention is susceptible to variations, modifications and changes within the scope of the appended claims.

We claim:

1. A hollow engraving point and holder for engraving coated transparent sheets and comprising: a body having an axial bore, a plunger axially slidable within and extending from the bore in said body, an engraving point having a scribing tip for engaging the coated transparent sheet, the extending end of said plunger having coaxial means for releasably holding said engraving point, said plunger and said engraving point each having an axial bore, and retractable means axially movable within the bore in said plunger and said engraving point for protruding from the scribing tip of said engraving point.

2. A hollow engraving point and holder for engraving coated transparent sheets and comprising: a body member having an axial bore at one end joining with an open circular cavity at the opposite end, an elongated plunger axially slidable within the circular cavity and extending from the bore in said body member, an engraving point having a scribing tip for engaging the coated transparent sheet, the extending end of said plunger having coaxial means for releasably holding said engraving point, said plunger and said engraving point each having an axial bore, and retractable means axially movable within the bore in said plunger and said engraving point for extending from the scribing tip of said engraving point.

3. A hollow engraving point and holder for engraving coated transparent sheets and comprising: a body member having an axial bore at one end joining with an open circular cavity at the opposite end, an elongated plunger axially slidable within the circular cavity and extending from the bore in said body member, an engraving point having a scribing tip for engaging the coated transparent sheet, the extending end of said plunger having coaxial means for releasably holding said engraving point, said plunger and said engraving point each having a axial bore, biasing means within the open circular cavity of said body member and engaging said plunger for biasing said plunger in the direction of the bore in said body member, and retractable means axially movable within the bore in said plunger and said engraving point for extending from the scribing tip of said engraving point.

4. A hollow engraving point and holder for engraving coated transparent sheets and comprising: a body member having an axial bore at one end joining with an open circular cavity at the opposite end, an elongated plunger axially slidable within the circular cavity and extending from the bore in said body member, an engraving point having an scribing tip for engaging the coated transparent sheet, the extending end of said plunger having coaxial means for releasably holding said engraving point, said plunger and said engraving point each having an axial bore, biasing means within the open circular cavity of said body member and engaging said plunger for biasing said plunger in the direction of the bore in said body member, adjusting means cooperatively engaging said body member and said biasing means for adjusting the force of said biasing means, and retractable means axially movable within the bore in said plunger and said engraving point for extending from the scribing tip of said engraving point.

5. A hollow engraving point assembly comprising: an elongated body terminating at one end in a scribing tip and having an axial bore through the scribing tip end forming a cutting edge and extending into a coaxial open end counterbore at the opposite end thereof, and an ejector pin having a first end slidably engaging the bore in said elongated body and a second end slidably engaging the counterbore in said elongated body; said ejector pin being axially slidable to protrude from and to retract inward from the scribing tip on said elongated body.

6. A hollow engraving point assembly comprising: an elongated body terminating at one end in a scribing tip and having an axial bore through the scribing tip end forming a cutting edge and extending into a coaxial open end counterbore at the oppostie end thereof, an ejector pin having a first end slidably engaging the bore in said elongated body and a second end slidably engaging the counterbore in said elongated body, and a compression spring coaxially surounding the first end on said ejector pin and nesting within the counterbore of said elongated body between the bottom of the counterbore therein and the second end on said ejector pin for axially biasing said ejector pin to place the tip of the first end inward from the scribing tip on said elongated body; said ejector pin being axialy movable against said compression spring to protrude the tip of the first end of said ejector pin through the scribing top on said elongated body.

7. A hollow engraving point assembly comprising: an elongated body terminating at one end in a diminishing diameter scribing tip and having an axial bore forming a cutting edge at the end of the scribing tip and extending into a coaxial open end counterbore at the opposite end thereof, an ejector pin having a first end slidably engaging the bore in said elongated body and a second end slidably engaging the counterbore in said elongated body, and a compression spring coaxially surrounding the first end on said ejector pin and nesting within the counterbore of said elongated body between the bottom of the counterbore therein and the second end on said ejector pin for axially biasing said ejector pin to place the tip of the first end inward from the scribing tip on said elongated body; said ejector pin being axially movable against said compression spring to protrude the tip of the first end on said ejector pin through the scribing tip on said elongated body.

8. A hollow engraving point assembly comprising: an elongated body terminating at one end in a conical scribing tip and having an axial bore forming a cutting edge at the end of the scribing tip and extending into a coaxial open end counterbore at the opposite end thereof, an ejector pin having a first end slidably engaging the bore in said elongated body and a second end slidably engaging the counterbore in said elongated body, and a compression spring coaxially surrounding the first end on said ejector pin and nesting within the counterbore of said elongated body between the bottom of the counterbore therein and the second end on said ejector pin for axially biasing said ejector pin to place the tip of the first end inward from the scribing tip on said elongated body; said ejector pin being axially movable against said compression spring to protrude the tip of the first end on said ejector pin through the scribing tip on said elongated body.

9. A hollow engraving point assembly comprising: an elongated body terminating at one end in a conical scribing tip and having an axial bore, the end of the bore intersecting the conical scribing tip being outwardly flared to provide a hollow ground cutting edge at the end of the scribing tip and having the opposite end of the bore extending into a coaxial open end counterbore at the opposite end of said elongated body, an ejector pin having a first end slidably engaging the bore in said elongated body and a second end slidably engaging the counterbore in said elongated body, and a compression spring coaxially surrounding the first end of said ejector pin and nesting within the counterbore of said elongated body between the bottom of the counterbore therein and the second end on said ejector pin for axially biasing said ejector pin to place the tip of the first end inward from the scribing tip on said elongated body; said ejector pin being axially movable against said compression spring to protrude the tip of the first end on said ejector pin through the scribing tip on said elongated body.

10. A holder for use with a hollow engraving point assembly having a body with an axial bore and an ejector pin slidable within the bore of the body; said holder comprising: an elongated body member having an axial bore at one end joining with an open circular cavity at the opposite end, an elongated plunger with an axial bore and having a first end axially slidable within the circular cavity in said body member and a second end extending through the bore in said body member and terminating in chuck means for releasably retaining the engraving point assembly, and retractable actuation means axially movable within the bore in said plunger for actuating the ejector pin in the engraving point assembly.

11. A holder for use with a hollow engraving point assembly having a body with an axial bore and an ejector pin slidable within the bore of the body; said holder comprising: an elongated body member having an axial bore at one end joining with an open circular cavity at the opposite end, an elongated plunger with an axial bore and having a first end end axially slidable within the circular cavity in said body member and a second end extending through the bore in said body member and terminating in chuck means for releasably retaining the engraving point assembly, biasing means within the open circular cavity of said body member and engaging said plunger for biasing said plunger in the direction of the bore in said body member, and retractable actuation means axially movable within the bore in said plunger for actuating the ejector pin in the engraving point assembly.

12. A holder for use with a hollow engraving point assembly having a body with an axial bore and an ejector pin slidable within the bore of the body; said holder comprising: an elongated body member having an axial bore at one end joining with an open circular cavity at the opposite end, an elongated plunger with an axial bore and having a first end axially slidable within the circular cavity in said body member and a second end extending through the bore in said body member and terminating in chuck means for releasably retaining the engraving point assembly, a compression spring within the open circular cavity of said body member and engaging the adjacent first end of said plunger, adjusting means movable on said body member and engaging said compression spring for adjusting the biasing force of said spring, and retractable actuation means actually movable within the bore in said plunger for actuating the ejector pin in the engraving point assembly.

13. A holder for use with a hollow engraving point assembly having a body with an axial bore and an ejector pin slidable within the bore of the body; said holder comprising: an elongated cylindrical body member having a first end containing an axial bore and a second end externally threaded and containing an open circular cavity coaxial with the bore in the first end thereof, an elongated plunger having a first end axially slidable within the circular cavity in said body member and a second end extending through the bore in said body member and terminating in chuck means for releasably retaining the engraving point assembly, a thimble having an internally threaded barrel engaging the external threads on said body member, a compression spring within the open circular cavity of said body member, and disposed between the adjacent first end of said plunger and said thimble, said thimble adjusting the biasing force on said compression spring biasing said plunger in the direction of the bore in the first end of said body member, said plunger and said thimble each having a bore coaxial with the bore in the first end of said body member, and an ejector pin actuating rod axially movable within the bores in said plunger and said thimble for actuating the ejector pin in the engraving point assembly.

14. A holder in accordance with claim 13 in which the barrel of said thimble is externally scribed with markings indicating axial positions, and further having: (a) a tubular barrel coaxially surrounding said thimble with one end joined to said body member and having a pointer on the opposite end to be proximate to the markings on said thimble, and (b) biasing means disposed between said thimble and said ejector pin actuating rod for biasing said ejector pin actuating rod from the ejector pin in the engraving point assembly.

15. A holder for use with a hollow engraving point assembly having a body with an axial bore and an ejector pin slidable within the bore of the body; said holder comprising: an elongated cylindrical body member having a first end containing an axial bore and a second end externally threaded and containing an open circular cavity coaxial with the bore in the first end thereof, an elongated plunger having a first end axially slidable within the circular cavity in said body member and a second end extending through the bore in said body member and terminating in chuck means for releasably retaining the engraving point assembly, said elongated plunger further having a bore coaxial with the bore in said body member, a thimble having an internally threaded barrel engaging the external threads on said body member and having a closed end with an internally threaded bore coaxial with the bore in said plunger, a compression spring within the open circular cavity of said body member and disposed between the adjacent first end of said plunger and said thimble, said thimble adjusting the biasing force of said compression spring biasing said plunger in the direction of the bore in the first end of said body member, and an ejector pin actuating rod axially movable within the bore in said plunger for actuating the ejector pin in the engraving point assembly, said ejector pin actuating rod having a threaded section engaging the threaded bore in said thimble.

16. A holder in accordance with claim 15 in which the barrel of said thimble is externally scribed with markings indicating axial positions and further having: a tubular barrel coaxially surrounding said thimble with one end joined to said body member and having a pointer on the opposite end to be proximate to the markings on said thimble.

17. A holder for use with a hollow engraving point having an elongated body terminating in a scribing point and containing an axial bore; said holder comprising: an elongated cylindrical body member having a first end containing an axial bore and a second end externally threaded and containing an open circular cavity coaxial with the bore in the first end thereof, an elongated plunger having a first end axially slidable within the circular cavity in said body member and a second end extending through the bore in said body member and terminating in chuck means for releasably retaining the hollow engraving point, a thimble having an internally threaded barrel engaging the external threads on said body member, a compression spring within the open circular cavity of said body member and disposed between the adjacent first end of said plunger and said thimble, said thimble adjusting the biasing force of said compression spring biasing said plunger in the direction of the bore in the first end of said body member, said plunger and said thimble each having a bore coaxial with the bore in the first end of said body member, and a purge rod axially movable within the bores in said plunger and said thimble for retracting to a position within and for protruding from the scribing point end of the bore in the engraving point.

18. A holder in accordance with claim 17 in which the barrel of said thimble is externally scribed with markings indicating axial positions, and further having: (a) a tubular barrel coaxially surrounding said thimble with one end joined to said body member and having a pointer on the opposite end to be proximate to the markings on said thimble, and (b) biasing means disposed between said thimble and said purge rod for biasing said purge rod to the retracted position within the bore of the engraving point.

19. A holder for use with a hollow engraving point assembly having a body with an axial bore and an ejector pin slidable within the bore of the body; said holder comprising: an elongated cylindrical body member having a first end containing an axial bore and a second end externally threaded and containing an open circular cavity coaxial with the bore in the first end thereof, a cap axially slidable within the open circular cavity of said body member, an elongated plunger having a first end joined to said cap and a second end axially slidable within and extending through the bore in said body member and terminating in chuck means for releasably retaining the engraving point assembly, said cap and said plunger each having a bore coaxial with the bore in said body member, a thimble having an internally threaded barrel engaging the external threads on said body member and having a closed end with an internally threaded bore coaxial with the bore in said plunger, a compression spring within the open circular cavity of said body member and disposed between the adjacent cap and said thimble, said thimble adjusting the biasing force of said compression spring biasing said cap and said plunger in the direction of the bore in the first end of said body member, actuating lever means cooperating between said body member and said cap for releasably actuating said cap and said plunger against said compression spring, and an ejector pin actuating rod axially movable within the bore in said cap and the bore in said plunger for actuating the ejector pin in the engraving point assembly, said ejector pin actuating rod having a threaded section engaging the threaded bore in said thimble.

20. A holder in accordance with claim 19 in which the barrel of said thimble is externally scribed with markings indicating axial positions, and further having: an index bracket having one end joined to said body member and having a pointer near the opposite end to be proximate to the markings on said thimble.

21. A holder for use with a hollow engraving point having an elongated body terminating in a scribing tip and containing an axial bore; said holder comprising: an elongated cylindrical body member having a first end containing an axial bore and a second end externally threaded and containing an open circular cavity coaxial with the bore in the first end thereof, a cap axially slidable within the open circular cavity of said body member, an elongated plunger having a first end joined to said cap and a second end axially slidable within and extending through the bore in said body member and terminating in chuck means for releasably retaining the hollow engraving point, a thimble having an internally threaded barrel engaging the external threads on said body member, a compression spring within the open circular cavity of said body member and disposed between the adjacent cap and said thimble, said thimble adjusting the biasing force of said compression spring biasing said cap and said plunger in the direction of the bore in the first end of said body member, said cap, said plunger, and said thimble each having a bore coaxial with the bore in the first end of said body member, actuating lever means cooperating between said body member and said cap for releasably actuating said cap and said plunger against said compression spring, and a purge rod axially movable within the bores in said plunger, said cap, and said thimble for retracting to a position within and for protruding from the scribing tip end of the bore in the engraving point.

22. A holder in accordance with claim 21 in which the barrel of said thimble is externally scribed with markings indicating axial positions and further having: an index bracket having one end joined to said body member and having a pointer near the opposite end to be proximate to the markings on said thimble.

23. A holder in accordance with claim 21 in which the barrel of said thimble is externally scribed with markings indicating axial positions and further having: (a) an index bracket having one end joined to said body member and having a pointer near the opposite end to be proximate to the markings on said thimble, and (b) biasing means disposed between said thimble and said purge rod for biasing said purge rod to the retracted position within the bore of the engraving point.

24. A hollow engraving point assembly and holder for engraving coated transparent sheets; said engraving point assembly comprising an elongated body terminating at one end in a scribing tip and having an axial bore through the scribing tip end extending into a coaxial open end counterbore at the opposite end thereof, and an ejector pin having a first end slidably engaging the bore in said elongated body and a second end slidably engaging the counterbore in said elongated body; said holder comprising an elongated body member having an axial bore at one end joining with an open circular cavity at the opposite end, an elongated plunger with an axial bore and having a first end axially slidable within the circular cavity in said body member and a second end extending through the bore in said body member and terminating in chuck means for releasably retaining said engraving point assembly, and retractable actuation means axially movable within the bore in said plunger for actuating the ejector pin in said engraving point assembly.

25. A hollow engraving point assembly and holder for engraving coated transparent sheets; said engraving point assembly comprising an elongated body terminating at one end in a scribing tip and having an axial bore through the scribing tip end extending into a coaxial open end counterbore at the opposite end thereof, an ejector pin having a first end slidably engaging the bore in said elongated body and a second end slidably engaging the counterbore in said elongated body, and a compression spring coaxial with the first end on said ejector pin and nesting within the counterbore of said elongated body between the bottom of the counterbore therein and the second end on said ejector pin for axially biasing said ejector pin away from the scribing tip end on said elongated body; said holder comprising an elongated body member having an axial bore at one end joining with an open circular cavity at the opposite end, an elongated plunger with an axial bore and having a first end axially slidable within the circular cavity in said body member and a second end extending through the bore in said body member and terminating in chuck means for releasably retaining said engraving point assembly, a compression spring within the open circular cavity of said body member and engaging the adjacent first end of said plunger, adjusting means movable on said body member and engaging said compression spring for adjusting the biasing force of said spring, and retractable actuation means axially movable within the bore in said plunger for actuating the ejector pin in said engraving point assembly.

26. A hollow engraving point assembly and holder for engraving coated transparent sheets; said engraving point assembly comprising an elongated body terminating at one end in a conical scribing tip and having an axial bore forming a cutting edge at the end of the scribing tip and extending into a coaxial open end counterbore at the opposite end thereof, an ejector pin having a first end slidably engaging the bore in said elongated body and a second end slidably engaging the counterbore in said elongated body, and a compression spring coaxial with the first end on said ejector pin and nesting within the counterbore of said elongated body between the bottom of the counterbore therein and the second end on said ejector pin for axially biasing said ejector pin away from the scribing tip end on said elongated body; said holder comprising an elongated cylindrical body member having a first end containing an axial bore and a second end externally threaded and containing an open end circular cavity coaxial with the bore in the first end thereof, an elongated plunger having a first end axially slidable within the circular cavity in said body member and a second end extending through the bore in said body member and terminating in chuck means for releasably retaining said engraving point assembly, a thimble having an internally threaded barrel engaging the external threads on said body member, a compression spring within the open circular cavity of said body member and disposed between the adjacent first end of said plunger and said thimble, said thimble adjusting the biasing force of said compression spring biasing said plunger in the direction of the bore in the first end of said body member, said plunger and said thimble having a bore coaxial with the bore in the first end of said body member, and an ejector pin actuating rod axially movable within the bores in said plunger and said thimble for moving said ejector pin against said compression spring in said engraving point assembly to protrude the first end on said ejector pin through the scribing tip on said elongated body.

27. A hollow engraving point and holder for engraving coated transparent sheets; said engraving point comprising an elongated body terminating at one end in a conical scribing tip and having an axial bore therethrough forming a cutting edge at the end of the scribing tip; said holder comprising an elongated cylindrical body member having a first end containing an axial bore and a second end externally threaded and containing an open end circular cavity coaxial with the bore in the first end thereof, an elongated plunger having a first end axially slidable within the circular cavity in said body member and a second end extending through the bore in said body member and terminating in chuck means for releasably retaining said hollow engraving point, a thimble having an internally threaded barrel engaging the external threads on said body member, a compression spring within the open circular cavity of said body member and disposed between the adjacent first end of said plunger and said thimble, said thimble adjusting the biasing force of said compression spring biasing said plunger in the direction of the bore in the first end of said body member, said plunger and said thimble each having a bore coaxial with the bore in the first end of said body member, and a purge rod axially movable within the bores in said thimble, said plunger and said engraving point for retracting to a position within and for protruding from the scribing tip end of the bore in said engraving point.

28. A hollow engraving point assembly and holder for engraving coated transparent sheets; said engraving point assembly comprising an elongated body terminating at one end in a conical scribing tip and having an axial bore forming a cutting edge at the end of the scribing tip and extending into a coaxial open end counterbore at the opposite end thereof, an ejector pin having a first end slidably engaging the bore in said elongated body and a second end slidably engaging the counterbore in said elongated body, and a compression spring coaxial with the first end on said ejector pin and nesting within the counterbore of said elongated body between the bottom of the counterbore therein and the second end on said ejector pin for axially biasing said ejector pin away from the scribing tip end on said elongated body; said holder comprising an elongated cylindrical body member having a first end containing an axial bore and a second end externally threaded and containing an open circular cavity coaxial with the bore in the first end thereof, a cap axially slidable within the open circular cavity of said body member, an elongated plunger having a first end joined to said cap and a second end axially slidable within and extending through the bore in said body member and terminating in chuck means for releasably retaining said engraving point assembly, said cap and said plunger each having a bore coaxial with the bore in said body member, a thimble having an internally threaded barrel engaging the external threads on said body member and having a closed end with an internally threaded bore coaxial with the bore in said plunger, a compression spring within the open circular cavity of said body member and disposed between the adjacent cap and said thimble, said thimble adjusting the biasing force of said compression spring biasing said cap and said plunger in the direction of the bore in the first end of said body member, actuating lever means cooperating between said body member and said cap for releasably actuating said cap and said plunger against said compression spring, and an ejector pin actuating rod axially movable within the bore in said cap and the bore in said plunger for actuating the ejector pin in said engraving point assembly, said ejector pin actuating rod having a threaded section engaging the threaded bore in said thimble.

29. A hollow engraving point and holder for engraving coated transparent sheets; said engraving point comprising an elongated body terminating at one end in a conical scribing tip and having an axial bore therethrough forming a cutting edge at the end of the scribing tip; said holder comprising an elongated cylindrical body member having a first end containing an axial bore and a second end externally threaded and containing an open circular cavity coaxial with the bore in the first end thereof, a cap axially slidable within the open circular cavity of said body member, an elongated plunger having a first end joined to said cap and a second and axially slidable within and extending through the bore in said body member and terminating in chuck means for releasably retaining said engraving point, a thimble having an internally threaded barrel engaging the external threads on said body member, a compression spring within the open circular cavity of said body member and disposed between the adjacent cap and said thimble, said thimble adjusting the biasing force of said compression spring biasing said cap and said plunger in the direction of the bore in the first end of said body member, said cap, said plunger, and said thimble each having a bore coaxial with the bore in the first end of said body member, actuating lever means cooperating between said body member and said cap for releasably actuating said cap and said plunger against said compression spring, and a purge rod axially movable within the bores in said plunger, said cap, and said thimble for retracting to a position within and for protruding from the scribing tip end of the bore in said engraving point.

References Cited

UNITED STATES PATENTS

| | | |
|---|---|---|
| 676,053 | 6/1901 | Sporleder 30—130 X |
| 2,735,177 | 2/1956 | Adams 33—18 X |
| 2,810,960 | 10/1957 | Johnson et al. 30—164.9 |
| 2,902,760 | 9/1959 | Koenig 30—164.9 |
| 2,943,389 | 7/1960 | Dubois 30—368 |
| 3,138,875 | 6/1964 | Christensen 33—18 |

FOREIGN PATENTS

| | | |
|---|---|---|
| 658,432 | 10/1951 | Great Britain. |

WILLIAM FELDMAN, *Primary Examiner.*

R. V. PARKER, Jr., *Assistant Examiner.*